US009354953B2

(12) United States Patent
Bickford et al.

(10) Patent No.: US 9,354,953 B2
(45) Date of Patent: May 31, 2016

(54) SYSTEM INTEGRATOR AND SYSTEM INTEGRATION METHOD WITH RELIABILITY OPTIMIZED INTEGRATED CIRCUIT CHIP SELECTION

(71) Applicant: International Business Machines Corporation, Armonk, NY (US)

(72) Inventors: Jeanne P. Bickford, Essex Junction, VT (US); Nazmul Habib, South Burlington, VT (US); Baozhen Li, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/339,854

(22) Filed: Jul. 24, 2014

(65) Prior Publication Data
US 2016/0026517 A1 Jan. 28, 2016

(51) Int. Cl.
*G06F 11/00* (2006.01)
*G06F 9/445* (2006.01)

(52) U.S. Cl.
CPC .......... *G06F 11/008* (2013.01); *G06F 9/44505* (2013.01)

(58) Field of Classification Search
CPC ............. G06F 11/008; G06F 9/44505; G06F 17/5009; G06F 11/2028; G06F 9/50; G01R 31/26
See application file for complete search history.

(56) References Cited

U.S. PATENT DOCUMENTS

| 3,889,188 | A | 6/1975 | Trindade |
| 6,789,032 | B2 | 9/2004 | Barbour et al. |
| 7,129,735 | B2 | 10/2006 | Subramaniam et al. |

(Continued)

FOREIGN PATENT DOCUMENTS

| CN | 102567560 A | 7/2012 |
| JP | 05-142293 | 8/1993 |

(Continued)

OTHER PUBLICATIONS

Disclosed Anonymously, "Reliability Monitor Method for Early vs. Late Fails", IP.com: IPCOM000234580D, Published Jan. 20, 2014, 5 pages.

(Continued)

*Primary Examiner* — Nadeem Iqbal
(74) *Attorney, Agent, or Firm* — Gibb & Riley, LLC; Steven J. Meyers, Esq.

(57) ABSTRACT

Disclosed is a computer system for system integration, wherein chip selection for a specific system is performance and reliability optimized and, thereby cost optimized. In the system, a memory stores a chip-level performance specification and a chip-level reliability specifications, each defined for a specific integrated circuit chip that is to be incorporated into a specific system. The memory also stores an inventory that references manufactured instances of the specific integrated circuit chip sorted into bins, which are associated with different performance process windows and which are assigned different reliability levels. A processor uses the inventory to select an instance of the specific integrated circuit chip from one of the bins for actual incorporation into the specific system and does so such that the chip-level performance specification and the chip-level reliability specification are met. Also disclosed are a method and a computer program product that can similarly perform system integration.

20 Claims, 5 Drawing Sheets

(56) References Cited

U.S. PATENT DOCUMENTS

| | | | |
|---|---|---|---|
| 7,194,366 B2 | 3/2007 | Singh et al. | |
| 7,218,984 B1 | 5/2007 | Bayat et al. | |
| 7,506,216 B2 * | 3/2009 | Bose | G06F 11/008 703/14 |
| 7,570,796 B2 | 8/2009 | Zafar et al. | |
| 8,276,018 B2 * | 9/2012 | Kursun | G06F 11/008 714/10 |
| 8,549,363 B2 | 10/2013 | Cher et al. | |
| 2008/0256383 A1 * | 10/2008 | Bose | G06F 11/008 714/1 |
| 2011/0078506 A1 * | 3/2011 | Graas | G06F 11/008 714/32 |
| 2012/0191384 A1 | 7/2012 | Kalgren et al. | |
| 2014/0039664 A1 | 2/2014 | Anemikos et al. | |
| 2014/0067302 A1 * | 3/2014 | Bickford | H01L 22/202 702/81 |
| 2014/0107822 A1 | 4/2014 | Chadwick et al. | |

FOREIGN PATENT DOCUMENTS

| | | |
|---|---|---|
| JP | 63-236980 | 3/1998 |
| JP | 2011-077287 | 4/2011 |
| WO | 03/044852 A2 | 5/2003 |

OTHER PUBLICATIONS

U.S. Appl. No. 13/922,311, BUR920120162US1, Application Filed Jun. 20, 2013, 51 pages.

* cited by examiner

INTEGRATED CIRCUIT CHIP I

| Performance Process Window Bins | A | B | C | D | E | F | G | H | I |
|---|---|---|---|---|---|---|---|---|---|
| Reliability Level | 3 | 2 | 1 | 3 | 2 | 1 | 3 | 1 | 2 |

SYSTEM INTEGRATOR AND SYSTEM INTEGRATION METHOD WITH RELIABILITY OPTIMIZED INTEGRATED CIRCUIT CHIP SELECTION

BACKGROUND

The present disclosure relates to system design and, more particularly, to embodiments of a computer system for system integration (i.e., a system integrator) and a computer-implemented method for system integration, wherein integrated circuit chip selection is reliability optimized and, thereby cost optimized.

In conventional system design, a system integrator selects integrated circuit chips (e.g., processor chip(s), memory chip(s), etc.) for incorporation into a specific system and ensures that these integrated circuit chips function together in order to achieve at least one system-level performance specification and a system-level reliability specification. The system-level performance specification can comprise, for example, a system-level maximum oscillation frequency (Fmax-system). The system-level reliability specification can, for example, be a system-level minimum useful life specification defined as a minimum number of power on hours (POHs) during which the specific system is expected, with a specified probability, to perform reliably (i.e., is expected, with a specified probability, to meet the system performance specification(s) without fail).

Typically, in order to meet the system-level reliability specification, the system integrator selects integrated circuit chips with the highest reliability and, particularly, with a chip-level reliability specification that is at least as high as the system-level reliability specification. That is, the system integrator selects integrated circuit chips wherein the minimum number of power on hours (POHs) during which each integrated circuit chip is expected to perform reliably is at least as high as the minimum number of power on hours (POHs) during which the specific system that incorporates them is expected to perform reliably. However, requiring each integrated circuit chip to meet the same reliability specification as the specific system as a whole may be unnecessary (e.g., because not all integrated circuit chips that are incorporated into a specific system will be powered anytime the specific system is powered on) and costly (e.g., because an integrated circuit chip that meets a relatively high reliability specification is typically more expensive than an integrated circuit chip with the same design that meets relatively low reliability specification).

SUMMARY

In view of the foregoing, disclosed herein is an embodiment of a computer system for system integration (i.e., a system integrator), wherein integrated circuit chip selection for a specific system is performance and reliability optimized and, thereby cost optimized. The computer system can comprise a memory and a processor in communication with the memory. The memory can store a chip-level performance specification and a chip-level reliability specifications, each defined for a specific integrated circuit chip that is to be incorporated into a specific system. The memory can also store an inventory that references manufactured instances of the specific integrated circuit chip sorted into bins, which are associated with different performance process windows and which are assigned different reliability levels. The processor can access the memory and, using the inventory, can select one of the manufactured instances of the specific integrated circuit chip from one of the bins for incorporation into the specific system and can, specifically, select one of the manufactured instances of the specific integrated circuit chip so that it meets the chip-level performance specification and the chip-level reliability specification. Also disclosed herein are embodiments of a computer-implemented method and a computer program product that can similarly be used to perform system integration.

More particularly, disclosed herein is an embodiment of a computer system for system integration. The computer system can comprise a memory and a processor in communication with the memory.

The memory can store a a chip-level performance specification and a chip-level reliability specification, each of which are defined for a specific integrated circuit chip that has been identified for incorporation into a specific system. The specific system can have a system-level reliability specification and the chip-level reliability specification can be equal to or less than the system-level reliability specification, but in any case, can specifically be defined so that, when the specific integrated circuit chip is incorporated into the specific system, the specific system still meets the system-level reliability specification.

The memory can further store an inventory that references manufactured instances of the specific integrated circuit chip. The manufactured instances of the specific integrated circuit chip can, as indicated in the inventory, be sorted into bins, which are associated with different performance process windows and which are assigned different reliability levels.

The processor can access the chip-level performance specification(s), the chip-level reliability specification and the inventory and can further select, from the inventory, one of the multiple instances of the specific integrated circuit chip from one of the bins for actual incorporation into the specific system. Selection of the instance of the specific integrated circuit chip can, specifically, be performed by the processor such that the chip-level performance specification and the chip-level reliability specification are met.

Also disclosed herein is an embodiment of a computer-implemented method for system integration. The method can comprise storing, in a memory, a chip-level performance specification and a chip-level reliability specification, each of which are defined for a specific integrated circuit chip that has been identified for incorporation into a specific system. The specific system can have a system-level reliability specification and the chip-level reliability specification can be equal to or less than the system-level reliability specification, but in any case, can specifically be defined so that, when the specific integrated circuit chip is incorporated into the specific system, the specific system still meets the system-level reliability specification.

The method can further comprise storing, in the memory, an inventory for the specific integrated circuit chip. This inventory can reference manufactured instances of the specific integrated circuit chip. The manufactured instances of the specific integrated circuit chip can, as indicated in the inventory, be sorted into bins, which are associated with different performance process windows and which are assigned different reliability levels.

The method can further comprise accessing, by a processor from the memory, the chip-level performance specification, the chip-level reliability specification and the inventory and selecting, by the processor from the inventory, one of the manufactured instances of the specific integrated circuit chip from one of the bins for incorporation into the specific system. Selection of the instance of the specific integrated circuit chip can, specifically, be performed such that the chip-level performance specification and the chip-level reliability specification are met.

Also disclosed herein is an embodiment of a computer program product for system integration. The computer program product can comprise a computer readable storage medium that stores a program instructions, which is executable by a computer system to cause the computer system to perform the above described system integration method.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, in conventional system design, a system integrator selects integrated circuit chips (e.g., processor chip(s), memory chip(s), etc.) for incorporation into a specific system and ensures that these integrated circuit chips function together in order to achieve at least one system-level performance specification and a system-level reliability specification. The system-level performance specification can comprise, for example, a maximum oscillation frequency (Fmax-system). The system-level reliability specification can, for example, be a minimum useful life specification defined as a minimum number of power on hours (POHs) during which the specific system is expected, with a specified probability, to perform reliably (i.e., is expected, with a specified probability, to meet the system performance specification(s) without fail).

Typically, in order to meet the system-level reliability specification, the system integrator selects integrated circuit chips with the highest reliability and, particularly, with a chip-level reliability specification that is at least as high as the system-level reliability specification. That is, the system integrator selects integrated circuit chips wherein the minimum number of power on hours (POHs) during which each integrated circuit chip is expected to perform reliably is at least as high as the minimum number of power on hours (POHs) during which the specific system that incorporates them is expected to perform reliably. However, requiring each integrated circuit chip to meet the same reliability specification as the specific system as a whole may be unnecessary (e.g., because not all integrated circuit chips that are incorporated into a specific system will be powered anytime the specific system is powered on) and costly (e.g., because an integrated circuit chip that meets a relatively high reliability specification is typically more expensive than an integrated circuit chip with the same design that meets relatively low reliability specification).

In view of the foregoing, disclosed herein is an embodiment of a computer system for system integration (i.e., a system integrator), wherein integrated circuit chip selection for a specific system is performance and reliability optimized and, thereby cost optimized. The computer system can comprise a memory and a processor in communication with the memory. The memory can store a chip-level performance specification and a chip-level reliability specifications, each defined for a specific integrated circuit chip that is to be incorporated into a specific system. The memory can also store an inventory that references manufactured instances of the specific integrated circuit chip sorted into bins, which are associated with different performance process windows and which are assigned different reliability levels. The processor can access the memory and, using the inventory, can select one of the manufactured instances of the specific integrated circuit chip from one of the bins for incorporation into the specific system and can, specifically, select one of the manufactured instances of the specific integrated circuit chip so that it meets the chip-level performance specification and the chip-level reliability specification. Also disclosed herein are embodiments of a computer-implemented method and a computer program product that can similarly be used to perform system integration.

Figure 1:
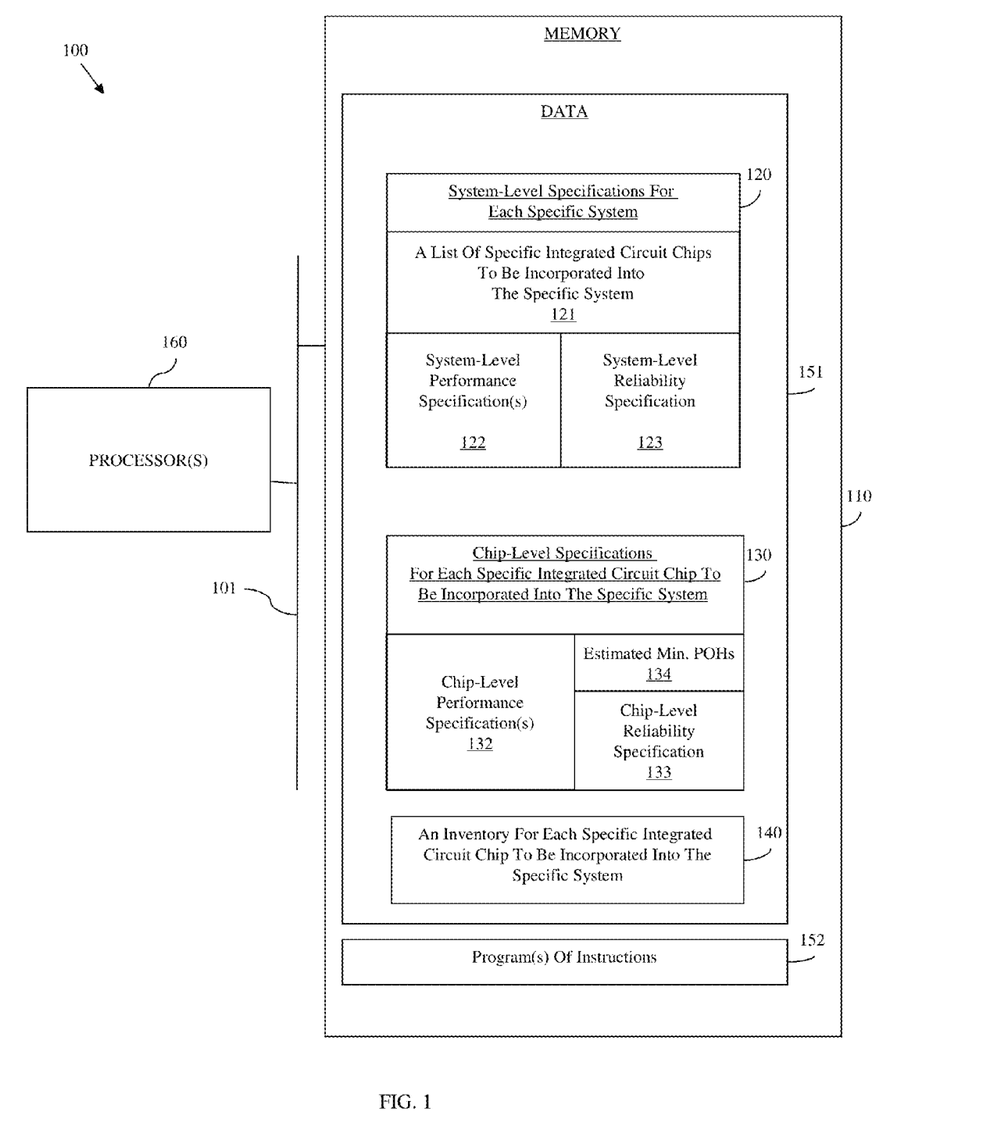
FIG. 1 is a schematic diagram illustrating a computer system for system integration.

More particularly, referring to FIG. 1, disclosed herein is an embodiment of a computer system 100 for system integration. As mentioned above, system integration generally refers to the selection of integrated circuit chips (e.g., processor chip(s), memory chip(s), etc.) for incorporation into a specific system such that the selected integrated circuit chips function together in order to achieve at least one system-level performance specification and a system-level reliability specification. In the computer system 100 disclosed herein, integrated circuit chip selection for a specific system under design is, not only performance optimized as is often the case with system integration, but also reliability optimized and, thereby cost optimized.

Figure 2:
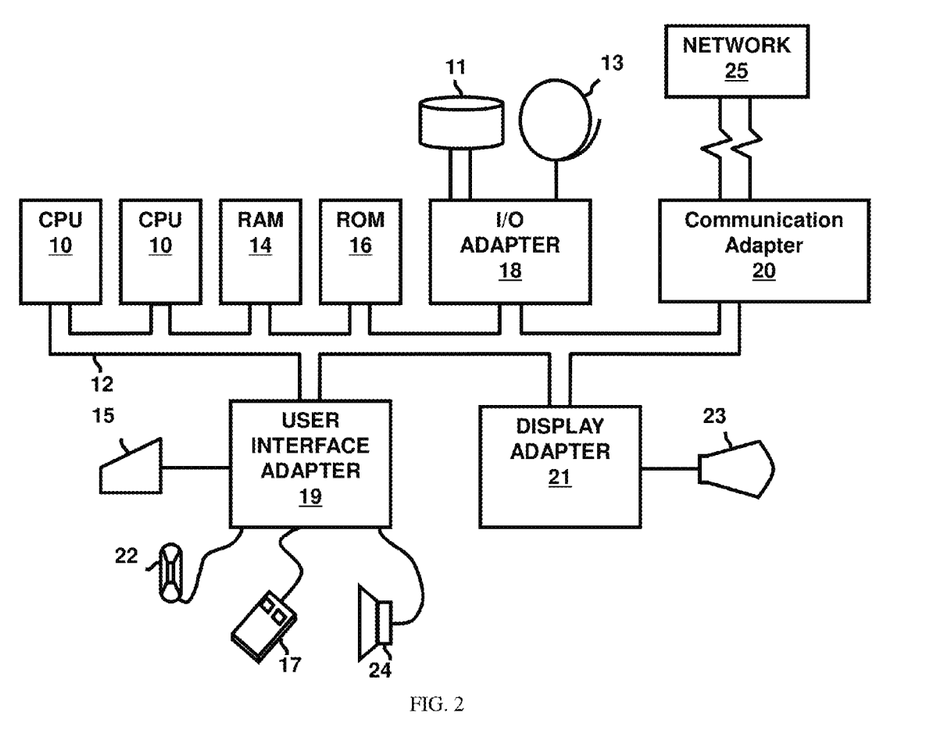
FIG. 2 is schematic diagram illustrating an exemplary hardware environment for implementing the computer systems, methods and computer program products disclosed herein.

Specifically, the computer system 100 can comprise a memory 110 (e.g., at least one data storage device) that stores (i.e., is adapted to store, is configured to store, etc.) data 151 and program(s) 152 of instructions. The computer system 100 can further comprise at least one processor 160, which is in communication with the memory 110 (e.g., over a system bus 101 or other wired or wireless network) and which can execute the program(s) 152 using the data 151 in order to perform system integration as described in detail below. This computer system 100 can be implemented, for example, in a computer hardware environment such as depicted in FIG. 2 and described in detail below. Alternatively, the computer system 100 could be implemented on any other computerized device or network of devices having the required data storage and processing capability to perform the system integration processes described below (e.g., a tablet computer, a laptop computer, a distributed computer system of multiple autonomous computers that communicate through a computer network, etc.).

The data 151 can comprise, for example, system-level specifications 120 for each specific system (e.g., a tablet computer, a laptop computer, a server, etc.), chip-level specifications 130 for each specific integrated circuit chip to be incorporated into a specific system, and an inventory 140 for each specific integrated circuit chip to be incorporated into a specific system, etc., as discussed in greater detail below. As referred to herein a specific integrated circuit chip is an integrated circuit chip of a specific type (e.g., a processor chip, a memory chip, etc.) and having a specific design.

The system-level specifications 120 for each specific system can comprise a specific list 121 of the different specific integrated circuit chips (e.g., specific processor chip(s), specific memory chip(s), etc.) identified, for example, by a system designer, for incorporation into the specific system.

The system-level specifications 120 for each specific system can also comprise system-level performance specification(s) 122 for that specific system. The system-level performance specification 122 can comprise, for example, a maximum system-level oscillation frequency (Fmax-system), which can be measured during system performance testing. Those skilled in the art will recognize that there are various system-level performance tests that can be performed where system performance, such as Fmax-system, can be measured for a given operation. These system-level performance tests can be performed at the overall system-level in the case of simple systems. However, for more complex systems, these system-level performance tests can be performed at some intermediate level within the system assembly that is above the integrated circuit chip level (e.g., at the printed circuit board level or some higher within the system assembly). Thus, it should be understood that the system-level performance specification 122 is directed to the performance of more than one integrated circuit chip incorporated into the specific system, if not all of the integrated circuit chips incorporated into the specific system.

The system-level specifications 120 for each specific system can also comprise a system-level reliability specification 123. The system-level reliability specification 123 can, for example, comprise a minimum expected useful life of the specific system measured in power on hours (POHs) or, more particularly, a minimum number of power on hours (POHs) during which the specific system is expected, with a specified probability, to perform without fail. Alternatively, the system-level reliability specification can comprise a worst-case operating temperature or a worst-case operating voltage under which the specific system is expected, with a specified probability, to perform without fail.

The above-described system-level performance specification(s) and system-level reliability specification can, for example, be designer-defined or customer-defined.

The chip-level specifications 130 for each specific integrated circuit chip identified for incorporation into the specific system can comprise chip-level performance specification(s) 132 for the specific integrated circuit chip. The chip-level performance specification 132 can comprise, for example, a maximum chip-level oscillation frequency (Fmax-chip), which can be measured using, for example, a performance screen ring oscillator (PSRO), during integrated circuit chip-level performance testing. It should be noted that the chip-level performance specification 132 can be manually defined (i.e., set), for example, by a system designer, and input into the computer system 100 for storage in the memory 110. Alternatively, the processor 160 can automatically define (i.e., can be adapted to define, can be configured to define, can execute a program 152 of instructions to define, etc.) this chip-level performance specification. In any case, this chip-level performance specification can be defined (i.e., set) so as to ensure that the system-level performance specification is met.

The chip-level specifications 130 for each specific integrated circuit chip identified for incorporation into the specific system can further comprise a chip-level reliability specification 133. It should be noted that the chip-level reliability specification for a specific integrated circuit chip identified for incorporation into a specific system can be manually defined, for example, by a system designer, and input into the computer system 100 for storage in the memory 110. Alternatively, the processor 160 can automatically define (i.e., can be adapted to define, can be configured to define, can execute a program 152 of instructions to define, etc.) this chip-level reliability specification. In any case, this chip-level performance specification can be defined (i.e., set) so as to ensure that the system-level performance specification is met.

Specifically, when the system-level reliability specification comprises a minimum (i.e., worst-case) expected useful life of the specific system, the chip-level reliability specification 133 can comprise a minimum (i.e., worst-case) expected useful life of the specific integrated circuit chip measured in power on hours (POHs) or, more particularly, a minimum number of power on hours (POHs) during which the specific integrated circuit chip is expected, with a specified probability, to perform without fail. This chip-level reliability specification 133 can, for example, be defined based on a previously determined minimum estimated number of power on hours (POHs) 134, which is also stored in memory 110, for the specific integrated circuit chip during the expected useful life, also as measured in power on hours (POHs), of the specific system. That is, because not all integrated circuit chips that are incorporated into a specific system will be powered anytime the specific system is powered on, the reliability specification for a specific integrated circuit chip that is going to be incorporated into a specific system may not need to be as high as the reliability specification for the specific system as a whole (i.e., may be relaxed as compared to the reliability specification for the specific system as a whole). Consequently, the chip-level reliability specification 133 for a specific integrated circuit chip to be incorporated into a specific system can be defined such that it is equal to the minimum estimated number of power on hours (POHs) 134 for that specific integrated circuit during the expected useful life of the specific system. Alternatively, to account for a margin of error in the minimum estimated number of power on hours (POHs) 134 for the specific integrated circuit chip during the useful life of the specific system, it can be defined such that it is equal to that minimum estimated number of power on hours (POHs) 134 plus some additional number of power on hour(s) (e.g., a percentage, such as 10%, 20%, etc. of the useful life of the specific system). In any case, the chip-level reliability specification 133 can be defined such that it is at least equal to the system-level reliability specification, when the specific integrated circuit chip is expected to be powered anytime the specific system is powered on, and it can be defined such that it is less than the system-level reliability specification, when the specific integrated circuit chip is not expected to be powered on all the time that the specific system is powered on. Thus, for example, system-level specifications 120 for three different types of systems (e.g., a tablet computer, a laptop computer and a server) can comprise different lists 121, but these different lists 121 can identify the same specific integrated circuit chip (e.g., the same specific processor chip, the same specific memory chip, etc.) for incorporation therein. However, since the minimum estimated number of power on hours (POHs) for that specific integrated circuit chip during the useful life of a tablet is less than that of a laptop, which in turn is less than that of a server, the chip-level reliability specification 133 for that specific integrated circuit chip for each of the three different types of systems will differ.

Alternatively, when the system-level reliability specification comprises a worst-case operating temperature or worst-case operating voltage, the chip-level reliability specification can comprise a worst-case operating temperature or a worst-case operating voltage, respectively, under which the specific integrated circuit chip is expected, with a specified probability, to perform without fail within the specific system. This chip-level reliability specification can be defined, for example, based on a previously determined maximum temperature or maximum voltage, respectively, at which the specific integrated circuit chip is expected to operate within the specific system. Because not all integrated circuit chips that are incorporated into a specific system will operate at the worst-case temperature or worst-case voltage of the specific system, the worst-case operating temperature and/or worst-case operating voltage for a specific integrated circuit chip that is going to be incorporated into a specific system may not need to be as high as the worst-case operating temperature and/or worst-case operating voltage for the specific system as a whole.

The inventory 140 for each specific integrated circuit chip can reference manufactured instances of that specific integrated circuit chip, wherein the manufactured instances are sorted into bins that are associated with different performance process windows and that are further assigned different reliability levels.

More specifically, those skilled in the art will recognize that, following manufacture, performance values for manufactured instances of a specific integrated circuit chip can be measured using performance monitors during integrated circuit chip-level performance testing and these performance values can be used to determine a performance process distribution for the specific integrated circuit chip (i.e., a distribution of performance values exhibited by the manufactured instances of the specific integrated circuit chip during integrated circuit chip-level performance testing). For example, maximum oscillation frequency values for manufactured instances of a specific integrated circuit chip can be measured using, for example, performance screen ring oscillators (PSROs) during integrated circuit chip-level performance testing and these maximum oscillation frequency values can be used to determine a maximum chip-level oscillation frequency (Fmax-chip) distribution (i.e., a distribution of maximum chip-level oscillation frequency (Fmax-chip) values exhibited by the manufactured instances of the specific integrated circuit chip during integrated circuit chip-level performance testing using one or more performance screen ring oscillators on each chip). The performance process distribution (e.g., from $-4\sigma$ to $+4\sigma$ or from $-3\sigma$ to $+3\sigma$) can be divided into sequential performance process windows with each window representing a different range of performance values within the distribution. For example, a maximum chip-level oscillation frequency (Fmax-chip) distribution (e.g., from $-4\sigma$ fast to $+4\sigma$ slow or from $-3\sigma$ fast to $+3\sigma$ slow) can be divided into sequential maximum chip-level oscillation frequency (Fmax-chip) windows with each window representing a different range of maximum chip-level oscillation frequencies (Fmax-chip) within the distribution.

Following performance testing, the manufactured instances of the specific integrated circuit chip can be sorted into performance process window bins that are associated with the different performance process windows and a corresponding inventory 140 can be generated and stored in the memory 110. This inventory 140 can reference manufactured instances of the specific integrated circuit chip sorted into bins, which are associated with the different performance process windows. Those skilled in the art will recognize that the process of sorting integrated circuit chips into performance process window bins does not necessarily refer to literally placing an integrated circuit chip into a container. Instead this process can refer to associating or tagging each particular manufactured instance of an integrated circuit chip with a part identifier (also referred to herein as a part number) that identifies the specific integrated circuit chip (i.e., the specific processor chip, the specific memory chip, etc.) and further identifies the performance process window into which the measured performance value of that particular manufactured instance of the specific integrated circuit chip falls (i.e., the specific performance process window bin).

Figure 3:
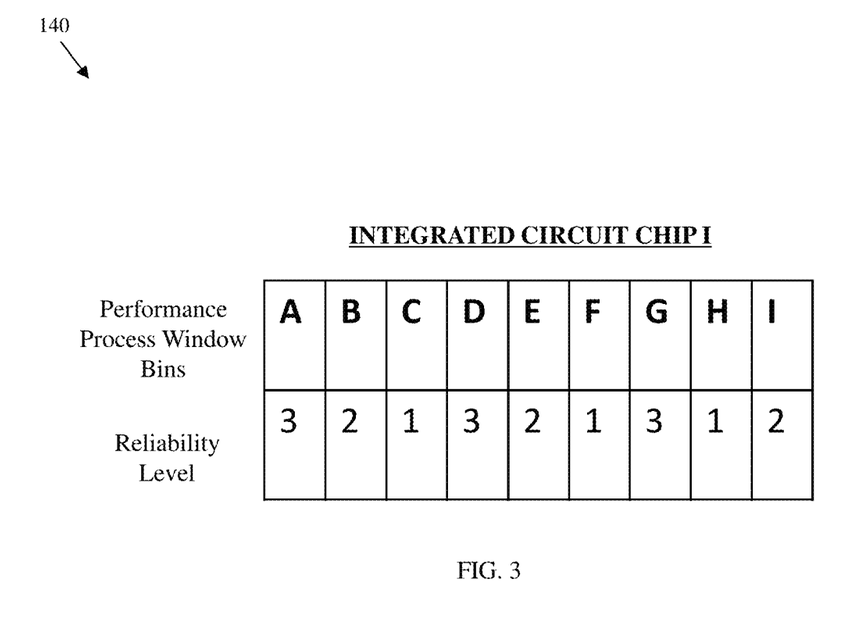
FIG. 3 is a table illustrating an exemplary inventory that references manufactured instances of a specific integrated circuit chip sorted into bins with each bin being associated with a different performance process window.

An exemplary inventory 140 is shown in FIG. 3. In this inventory 140, performance process window bins, which are labeled A-I can be associated with different ranges of performance values in sequence within a performance process distribution (e.g., from $-4\sigma$ to $+4\sigma$ or from $-3\sigma$ to $+3\sigma$). For example, performance process window bins A-I can be associated with different ranges of maximum oscillation frequencies (Fmax-chip)) in sequence within a maximum chip-level oscillation frequency (Fmax-chip) distribution (e.g., from $-4\sigma$ fast to $+4\sigma$ slow or from $-3\sigma$ fast to $+3\sigma$ slow) such that performance process window bin A contains the fastest manufactured instances of the specific integrated circuit chip and performance process window bin I contains the slowest manufactured instances of the specific integrated circuit chip, as indicated by the measured performance values. For illustration purposes, nine performance process window bins are shown; however, it should be understood that the manufactured instances of the specific integrated circuit chip could be sorted into any number of two or more performance process window bins associated with any number of two or more performance process windows, respectively. Although not shown, a key or additional labeling can be used to define the different ranges of performance values for each performance process window bin.

Additionally, each performance process window bin (e.g., each bin A-I) in the inventory 140 can be assigned a reliability level and, particularly, a minimum reliability level (i.e., a worst-case reliability level). The assigned reliability levels can be relative reliability levels. For example, the assigned reliability levels can be reliability level 1, reliability level 2 or reliability level 3 (as shown) or, similarly, reliability level "High", reliability level "Medium", or reliability level "Low". It should be understood that reliability levels assigned should correspond to the same type of reliability measurement defined by the chip-level reliability specification.

For example, the relative reliability level assigned to a given bin can, for example, correspond to a minimum number of power on hours (POHs) during which any manufactured instance of the specific integrated circuit chip in that given bin is expected, with a specified probability, to perform without fail. Thus, for example, reliability level 1 (or "High") would correspond to a relatively high minimum number of power on hours (POHs), reliability level 3 (or "Low") would correspond to a relatively low minimum number of power on hours (POHs) and reliability level 2 (or "Medium") would correspond to some intermediate minimum number of power on hours (POHs). Alternatively, the reliability level assigned to a given bin can correspond to a maximum temperature or maximum voltage, respectively, at which any manufactured instance of the specific integrated circuit chip in that given bin is expected, with a specified probability, to perform without fail. Thus, for example, reliability level 1 (or "High") would correspond to a relatively high maximum operating temperature or voltage, reliability level 3 (or "Low") would correspond to a relatively low maximum operating temperature or voltage and reliability level 2 (or "Medium") would correspond to some intermediate maximum operating temperature or voltage. Although not shown, a key or additional labeling can be used to define the corresponding number of power on hour(s) (or maximum operating temperature or maximum operating voltage) indicated by each of the relative reliability levels.

For illustration purposes, three different relative reliability levels are shown as being assigned to the various bins; however, any number of two or more different relative reliability levels could be used. Alternatively, each performance process window bin can be assigned a specific reliability level (e.g., a specific minimum number of power on hours (POHs) during which any manufactured instance of the specific integrated circuit chip in that bin is expected, with a specified probability, to perform without fail).

Any suitable techniques can be used for modeling the reliability of manufactured instances of a specific integrated circuit chip that are sorted into performance process window bins and for assigning reliability levels and, particularly, minimum reliability levels to the various performance process window bins, as described above, based on that reliability modeling. Additionally, it should be noted that such reliability modeling can be performed so as to take into account multiple different reliability failure mechanisms and so as to take into account the fact that the probability of the occurrence of a failure due to any one or more of these failure mechanisms may vary as a function of the different performance process windows.

Specifically, integrated circuit chips have multiple different failure mechanisms that are time dependent and/or use-condition dependent. These failure mechanisms include, but are not limited to, time-dependent dielectric breakdown (TDDB) of the gate dielectric material, hot carrier injection (HCI), biased temperature instability (BTI), soft error rate (SER), retention disturbance, electromigration (EM), stress migration (SM), and TDDB of the dielectric material between metal lines. Such failure mechanisms are well known in the art and, thus, the details thereof are not included within this specification in order to allow the reader to focus on the salient aspects of the disclosed embodiments. However, it should be understood that these failure mechanism impact integrated circuit chip reliability and, thereby are referred to herein as reliability failure mechanism.

As discussed in detail in U.S. patent application Ser. No. 13/922,311 of Bickford et al., filed on Jun. 20, 2013, and incorporated herein in its entirety by reference, some reliability failure mechanisms have a probability of the occurrence of a failure (also referred to herein as the probability of a failure or failure probability) that changes through a performance process window distribution. Specifically, BTI and HCI vary as a function of the front end of the line (FEOL) process window whereby there are more fails seen at the slow end of the process distribution. On the other hand, TDDB and EM also vary as a function of both FEOL and BEOL process window, but there are more fails seen at the fast end of the process distribution. Additionally, some reliability failure mechanisms do not vary as a function of the performance process window but instead may have relationships to other process window variation, e.g., stress voiding (via size, metal content), defects (overlay, pitch), and chip package interaction (CPI) (metal content).

Figure 4:
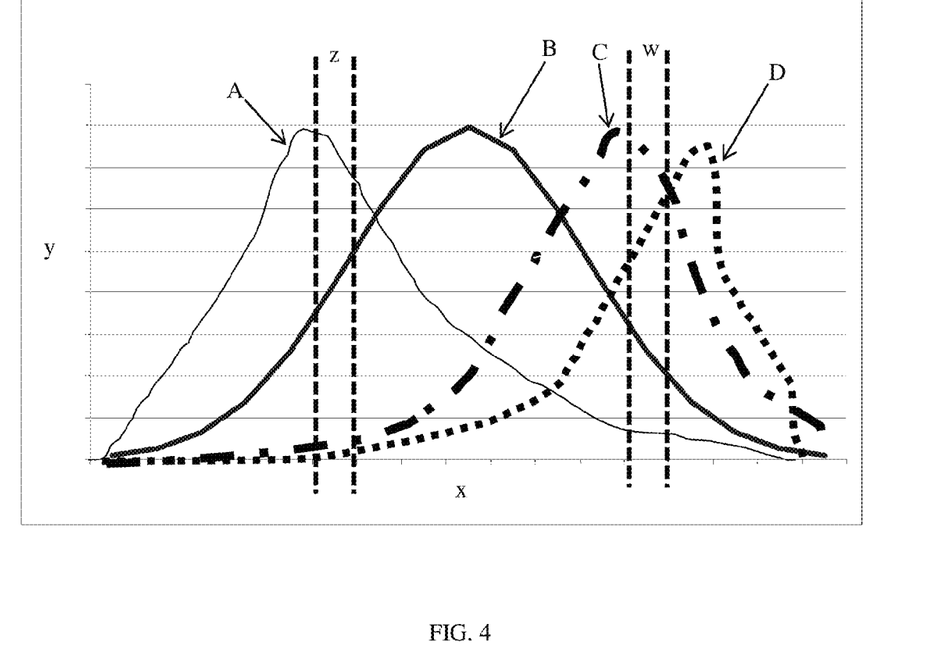
FIG. 4 is a graph of curves A, B, C and D, each illustrating variations in the probability of the occurrence of a failure for one of multiple different reliability failure mechanisms, where the probability of the occurrence of a failure "y" changes through the performance process distribution "x"; and, FIG. 5 is a flow diagram illustrating a system integration method.

FIG. 4 is a graph with curves A, B, C and D, each illustrating variations in the probability of the occurrence of a failure (i.e., each illustrating probability of failure distributions) for one of multiple different reliability failure mechanisms, where the probability of the occurrence of a failure "y" changes through the performance process distribution "x". Therefore, when failure mechanism models (i.e., reliability models for specific failure mechanisms) are run with limits on the space "z" within the process window distribution "x" (i.e., the performance process distribution), the failure mechanism models may not accurately portray the actual reliability of the manufacturing line or product. For instance, failure mechanism models C and D that are run with limits on the process space "z" within the process window distribution "x" may not demonstrate any reliability issues, which does not accurately portray the actual reliability of the manufacturing line or product that includes semiconductor devices that fall outside of process space "z" (e.g., semiconductor devices within process space "w" in which the failure mechanism models C and D may demonstrate a higher probability for reliability issues).

Thus, U.S. patent application Ser. No. 13/922,311 discloses a technique in which aggregate reliability models, which account for multiple different reliability failure mechanisms, are generated for each of multiple bins associated with different performance process windows, respectively, across a performance process distribution. Specifically, multiple performance process window-dependent reliability models are generated for each performance process window bin such that each performance process window-dependent reliability model is associated with a different reliability failure mechanism and takes into consideration a fail rate (e.g., as measured in units FIT defined as one failure per billion part hours) set for that reliability failure mechanism. Thereafter, for each performance process window bin, a technology-level model may be generated by aggregating the different fail rates for the different failure mechanisms for that bin using the following formula:

$$F = 1 - \prod_i (1 - F_i) \qquad (1)$$

where: F=an overall failure probability, i=a failure mechanism and $F_i=$ is a function of the failure mechanism for example $F_i$=f(temperature, frequency, voltage).

In the present computer system 100, the processor 160 can use a technique similar to that described in U.S. patent application Ser. No. 13/922,311. That is, the processor 160 generate (i.e., can be adapted to generate, can be configured to generate, can execute a program 152 of instructions to generate, etc.) reliability models associated with different failure mechanisms for the manufactured instances of the specific integrated circuit chip in each performance process window bin. Then, based on the reliability models associated with the different failure mechanisms for a given performance process window bin, the processor 160 can generate (i.e., can be adapted to further generate, can be configured to generate, can execute a program 152 of instructions to generate, etc.) an aggregate reliability model for that given performance process window bin. Such aggregate reliability models can further be generated for each performance process window bin. The resulting aggregate reliability models, which indicate overall failure probabilities for each of the different performance process window bins, can then be used to determine the expected useful life of the integrated circuit chips in each of the different performance process window bins and, thereby used to set the different reliability levels and, particularly, the different worst-case reliability levels to be assigned to the performance process window bins.

Subsequently, the processor 160 can access (i.e., can be adapted to access, can be configured to access, can execute a program 152 of instructions to access, etc.) the data 151 and, particularly, the chip-level performance specification(s) 132 and the chip-level reliability specification 133 for a specific integrated circuit chip identified on a specific list 121 for incorporation into the specific system as well as the inventory 140 for that specific integrated circuit chip. The processor 160 can further use the inventory 140 to select (i.e., can be adapted to use the inventory 140 select, can be configured to use the inventory 140 to select, can execute a program 152 of instructions that uses the inventory 140 to select, etc.) one of the multiple instances of the specific integrated circuit chip from one of the bins (e.g., from bin A-I) for actual incorporation into the specific system. Selection of the instance of the specific integrated circuit chip can, specifically, be performed by the processor 160 such that both the chip-level performance specification(s) 132 and the chip-level reliability specification 133 are met and, thereby such that the system-level performance specification(s) 122 and the system-level reliability specification 123 are met.

For example, referring to the inventory 140 of FIG. 3, if the chip-level performance specification 132 indicates that the Fmax-chip must be at least as fast as any instance of the specific integrated circuit chip in bin D with A being the fastest bin and I being the slowest bin and if the chip-level reliability specification 133 is reliability level 3 with 1 being the highest and 3 being the lowest reliability, then the instance of the specific integrated circuit chip can be selected from bin D. However, if the chip-level performance specification 132 indicates that the Fmax-chip must be at least as fast as any instance of the specific integrated circuit chip in bin C and if the chip-level reliability specification 133 is reliability level 2 (or "Medium"), then the instance of the specific integrated circuit chip can be selected from bin B.

As mentioned above, a part identifier (also referred to herein as a part number) can identify the specific integrated circuit chip (i.e., the specific processor chip, the specific memory chip, etc.) and can further identify the performance process window into which the measured performance value of that particular manufactured instance of the specific integrated circuit chip falls (i.e., the specific performance process window bin). This part identifier can further indicate the reliability level assigned to the specific performance process window bin. For example, referring to the inventory 140, a part identifier (e.g., IA3, IB2, IC1, ID3, etc.) can indicate the specific integrated circuit chip (i.e., Integrated Circuit Chip I), a specific performance process window bin for that chip (e.g., performance process window bin A, B, C, D, E, F, G, H or I) and a reliability level assigned to the specific performance process window bin (e.g., 1, 2 or 3). Thus, the specific integrated circuit chip that meets the chip-level performance specification(s) 132 and the chip-level reliability specification 133 for incorporation into a specific system can be selected by using the corresponding part identifier (e.g., IA3, IB2, IC1, etc.).

The processor 160 can repeat (i.e., can be adapted to repeat, can be configured to repeat, can execute the program 152 of instructions to repeat, etc.) the processes described above for each additional integrated circuit identified on the specific list 121 for incorporation into the specific system. That is, for each additional integrated circuit chip (e.g., each additional processor chip, each additional memory chip, etc.) identified on the specific list 121 for incorporation into the specific system, the processor 160 can access, from memory 110, additional chip-level performance specification(s), an additional chip-level reliability specification and an additional inventory, which references manufactured instances of that additional integrated circuit chip sorted into bins that are associated with the different performance process windows and that are assigned different reliability levels. The processor 160 can further select, using the additional inventory, a manufactured instance of that additional integrated circuit chip from one of the bins so as to meet the additional chip-level performance specification and the additional chip-level reliability specification. The processor 160 can similarly repeat these processes for all integrated circuit chips identified on another list for incorporation into yet another system.

Additionally, after a manufactured instance of a specific integrated circuit chip is selected and incorporated into a specific system, the processor 160 can receive (i.e., can be adapted to receive, can be configured to receive, etc.) feedback regarding the operation of the specific integrated circuit chip within the specific system and can use this feedback to define a chip-level reliability specification during a subsequent system integration process. Thus, for example this feedback can, for example, indicate the actual number of power on hours (POHs) of that manufactured instance of the specific integrated circuit chip within the specific system and based on the actual number of power on hours (POHs), the processor 160 can adjust (i.e., can be adapted to adjust, can be configured to adjust, can execute a program 152 of instructions to adjust, etc.) the minimum estimated number of power on hours (POHs) 134 for that specific integrated circuit chip within the specific system and this adjusted minimum estimated number of power on hours (POHs) can be stored for use by the processor 160 during a subsequent integrated circuit chip selection process. This feedback can, for example, be received directly from the specific system (e.g., over a wired or wireless network connection). Alternatively, the feedback can be received any other source (e.g., a server that collects such data, a designer or other user that inputs the data, etc.).

Also disclosed herein is an embodiment of a computer-implemented method for system integration, wherein integrated circuit chip selection for a specific system under design is, not only performance optimized as is often the case with system integration, but also reliability optimized and, thereby cost optimized. This method can be implemented using a computer system, such as the computer system 100 described in detail above, which comprises a memory 110 and at least one processor 160 in communication with the memory 110.

Figure 5:
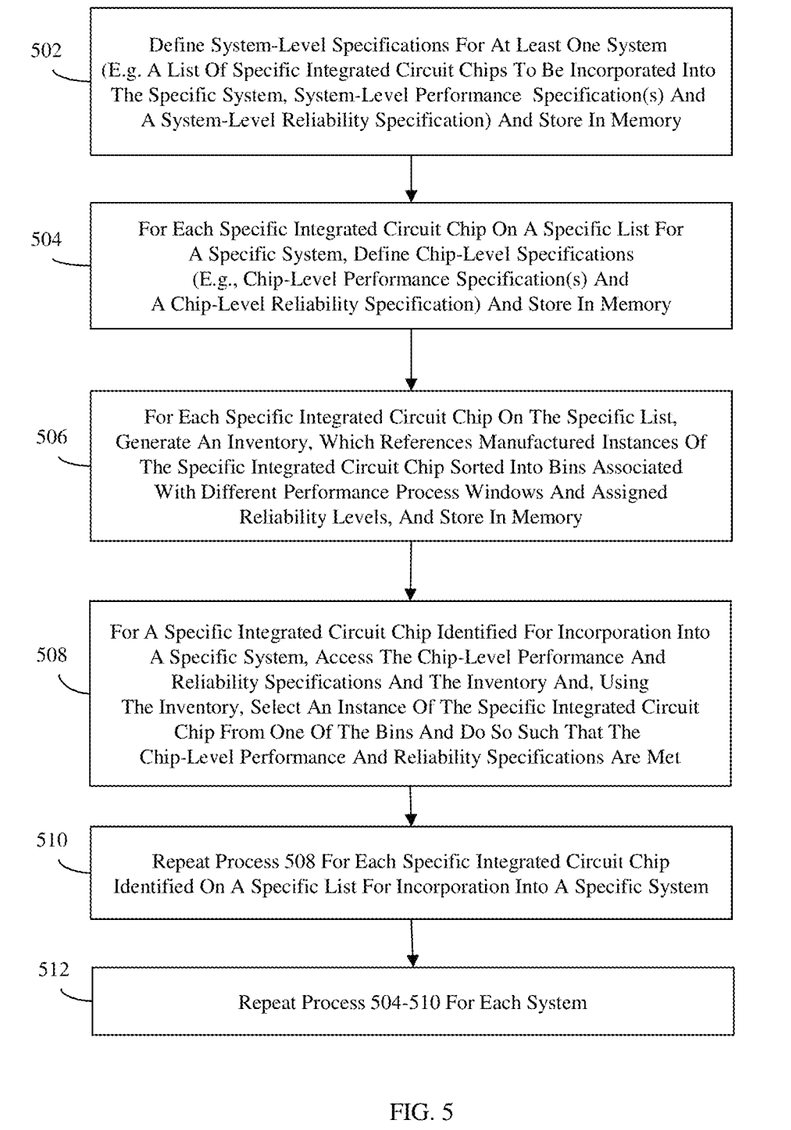

Referring to the flow diagram of FIG. 5 in combination with the computer system diagram of FIG. 1, the method can comprise defining (i.e., setting) system-level specifications 120 for at least one system and storing those system-level specifications 120 in memory 110 (502).

For each specific system, the system-level specifications 120 can comprise a specific list 121 of the different specific integrated circuit chips (e.g., specific processor chip(s), specific memory chip(s), etc.) identified, for example, by a system designer, for incorporation into that specific system. As referred to herein a specific integrated circuit chip is an integrated circuit chip of a specific type (e.g., a processor chip, a memory chip, etc.) and having a specific design.

For each specific system, the system-level specifications 120 can also comprise system-level performance specification(s) 122 for that specific system and a system-level reliability specification 123 for that specific system. The system level performance and reliability specifications can, for example, be designer-defined or customer-defined at process 502 and input into the computer system 100 for storage in memory 110. In any case, the system-level performance specification 122 can comprise, for example, a maximum system-level oscillation frequency (Fmax-system), which can be measured during system performance testing. Those skilled in the art will recognize that there are various system-level performance tests that can be performed where system performance, such as Fmax-system, can be measured for a given operation. These system-level performance tests can be performed at the overall system level in the case of simple systems. However, for more complex systems, these system-level performance tests can be performed at some intermediate level within the system assembly that is above the integrated circuit chip level (e.g., at the printed circuit board level or some higher within the system assembly). Thus, it should be understood that the system-level performance specification 122 is directed to the performance of more than one integrated circuit chip incorporated into the specific system, if not all of the integrated circuit chips incorporated into the specific system.

The system-level reliability specification can, for example, comprise a minimum expected useful life of the specific system measured in power on hours (POHs) or, more particularly, a minimum number of power on hours (POHs) during which the specific system is expected, with a specified probability, to perform without fail. Alternatively, this system-level reliability specification can comprise a worst-case operating temperature or worst-case operating voltage under which the specific system is expected, with a specified probability, to perform without fail.

The method can further comprise, for each specific integrated circuit chip identified on a specific list 121 for incorporation into a specific system, defining (i.e., setting) chip-level specifications 130 and storing those chip-level specifications 130 in memory 110 (504).

The chip-level specifications 130 can comprise chip-level performance specification(s) 132. The chip-level performance specification 132 can comprise, for example, a maximum chip-level oscillation frequency (Fmax-chip), which can be measured using, for example, a performance screen ring oscillator (PSRO), during integrated circuit chip-level performance testing. It should be noted that the chip-level performance specification 132 for a specific integrated circuit chip defined at process 504 manually, for example, by a system designer, and input into the computer system 100 for storage in the memory 110. Alternatively, it can be defined at process 504 automatically by a processor 160. In any case, this chip-level performance specification can be defined so as to ensure that the system-level performance specification is met.

The chip-level specifications 130 can further comprise a chip-level reliability specification 133. It should be noted that the chip-level reliability specification 133 for a specific integrated circuit chip identified on a specific list 121 for incorporation into a specific system can be defined at process 504 manually, for example, by a system designer, and input into the computer system 100 for storage in the memory 110. Alternatively, this chip-level reliability specification 133 can be defined at process 504 automatically, for example, by the processor 160. In any case, this chip-level performance specification can be defined (i.e., set) so as to ensure that the system-level performance specification is met.

Specifically, when the system-level reliability specification comprises a minimum (i.e., worst-case) expected useful life of the specific system, the chip-level reliability specification 133 can comprise a minimum (i.e., worst-case) expected useful life of the specific integrated circuit chip measured in power on hours (POHs) or, more particularly, a minimum number of power on hours (POHs) during which the specific integrated circuit chip is expected, with a specified probability, to perform without fail. This chip-level reliability specification 133 can, for example, be defined at process 504 based on a previously determined minimum estimated number of power on hours (POHs) 134, which is also stored in memory 110, for the specific integrated circuit chip during the expected useful life, also as measured in power on hours (POHs), of the specific system. That is, because not all integrated circuit chips that are incorporated into a specific system will be powered anytime the specific system is powered on, the reliability specification for a specific integrated circuit chip that is going to be incorporated into a specific system may not need to be as high as the reliability specification for the specific system as a whole (i.e., may be relaxed as compared to the reliability specification for the specific system as a whole). Consequently, the chip-level reliability specification 133 for a specific integrated circuit chip identified on a specific list 121 for incorporation into a specific system can be defined (i.e., set) at process 504 such that it is equal to the minimum estimated number of power on hours (POHs) 134 for that specific integrated circuit during the expected useful life of the specific system. Alternatively, to account for a margin of error in the minimum estimated number of power on hours (POHs) 134 for the specific integrated circuit chip during the useful life of the specific system, it can be defined at process 504 such that it is equal to that minimum estimated number of power on hours (POHs) 134 plus some additional number of power on hour(s) (e.g., a percentage, such as 10%, 20%, etc. of the useful life of the specific system). In any case, the chip-level reliability specification 133 can be defined at process 504 such that it is at least equal to the system-level reliability specification, when the specific integrated circuit chip is expected to be powered anytime the specific system is powered on, and it can be defined such that it is less than the system-level reliability specification, when the specific integrated circuit chip is not expected to be powered on all the time that the specific system is powered on.

Alternatively, when the system-level reliability specification comprises a worst-case operating temperature or a worst-case operating voltage, the chip-level reliability specification can comprise a worst-case operating temperature or a worst-case operating voltage, respectively, under which the specific integrated circuit chip is expected, with a specified probability, to perform without fail within the specific system. This chip-level reliability specification can be defined, for example, based on a previously determined maximum temperature or maximum voltage, respectively, at which the specific integrated circuit chip is expected to operate within the specific system. Because not all integrated circuit chips that are incorporated into a specific system will operate at the worst-case temperature or worst-case voltage of the specific system, the worst-case operating temperature and/or worst-case operating voltage for a specific integrated circuit chip that is going to be incorporated into a specific system may not need to be as high as the worst-case operating temperature and/or worst-case operating voltage for the specific system as a whole.

The method can further comprise generating an inventory 140 for each specific integrated circuit chip identified on a specific list 121 for incorporation into a specific system and storing that inventory 140 in memory 110 (506). Specifically, for each specific integrated circuit chip, this inventory 140 can be generated so that it references manufactured instances of the specific integrated circuit chip, wherein the manufactured instances are sorted into bins that are associated with different performance process windows and that are further assigned different reliability levels.

More specifically, those skilled in the art will recognize that, following manufacture, performance values for manufactured instances of a specific integrated circuit chip can be measured using performance monitors during integrated circuit chip-level performance testing and these performance values can be used to determine a performance process distribution for the specific integrated circuit chip (i.e., a distribution of performance values exhibited by the manufactured instances of the specific integrated circuit chip during integrated circuit chip-level performance testing). For example, maximum oscillation frequency values for manufactured instances of a specific integrated circuit chip can be measured using, for example, performance screen ring oscillators (PSROs) during integrated circuit chip-level performance testing and these maximum oscillation frequency values can be used to determine a maximum chip-level oscillation frequency (Fmax-chip) distribution (i.e., a distribution of maximum chip-level oscillation frequency (Fmax-chip) values exhibited by the manufactured instances of the specific integrated circuit chip during integrated circuit chip-level performance testing using one or more performance screen ring oscillators on each chip). The performance process distribution (e.g., from $-4\sigma$ to $+4\sigma$ or from $-3\sigma$ to $+3\sigma$) can be divided into sequential performance process windows with each window representing a different range of performance values within the distribution. For example, a maximum chip-level oscillation frequency (Fmax-chip) distribution (e.g., from $-4\sigma$ fast to $+4\sigma$ slow or from $-3\sigma$ fast to $+3\sigma$ slow) can be divided into sequential maximum chip-level oscillation frequency (Fmax-chip) windows with each window representing a different range of maximum chip-level oscillation frequencies (Fmax-chip) within the distribution.

Following performance testing, the manufactured instances of the specific integrated circuit chip can be sorted into performance process window bins that are associated with the different performance process windows and a corresponding inventory 140 can be generated at process 506 and stored in the memory 110. This inventory 140 can reference manufactured instances of the specific integrated circuit chip sorted into bins, which are associated with the different performance process windows. Those skilled in the art will recognize that the process of sorting integrated circuit chips into performance process window bins does not necessarily refer to literally placing an integrated circuit chip into a container. Instead this process can refer to associating or tagging each particular manufactured instance of an integrated circuit chip with a part identifier (also referred to herein as a part number) that identifies the specific integrated circuit chip (i.e., the specific processor chip, the specific memory chip, etc.) and further identifies the performance process window into which the measured performance value of that particular manufactured instance of the specific integrated circuit chip falls (i.e., the specific performance process window bin). As discussed in detail above with regard to the computer system embodiment, an exemplary inventory 140 is shown in FIG. 3. In this inventory 140, performance process window bins, which are labeled A-I can be associated with different ranges of performance values in sequence within a performance process distribution (e.g., from $-4\sigma$ to $+4\sigma$ or from $-3\sigma$ to $+3\sigma$).

Additionally, during generation of an inventory 140 at process 506, each performance process window bin (e.g., each bin A-I) in the inventory 140 can be assigned a reliability level and, particularly, a minimum reliability level (i.e., a worst-case reliability level). As discussed in detail above with regard to the computer system embodiment, the assigned reliability levels can be relative reliability levels (e.g., reliability level 1, reliability level 2 or reliability level 3 (as shown). It should be understood that the reliability levels assigned should correspond to the same type of reliability measurement defined in the chip-level reliability specification. For example, if the chip-level reliability specification refers to a minimum expected useful life of the integrated circuit chip measured in power on hours (POHs), each reliability level can correspond to a different minimum number of power on hours (POHs) during which any manufactured instance of the specific integrated circuit chip in a given bin is expected, with a specified probability, to perform without fail. Alternatively, if the chip-level reliability specification refers to a maximum operating temperature or maximum operating voltage, each reliability level can correspond to a different maximum temperature or maximum voltage, respectively, at which any manufactured instance of the specific integrated circuit chip in that given bin is expected, with a specified probability, to perform without fail. Although not shown, a key or additional labeling can be used to define the corresponding number of power on hour(s) (or maximum operating temperature or maximum operating voltage) indicated by each of the relative reliability levels.

For illustration purposes, three different relative reliability levels are shown as being assigned to the various bins; however, any number of two or more different relative reliability levels could be used. Alternatively, each performance process window bin can be assigned a specific reliability level (e.g., a specific minimum number of power on hours (POHs) during which any manufactured instance of the specific integrated circuit chip in that bin is expected, with a specified probability, to perform without fail).

During generation of an inventory 140 at process 506, any suitable techniques can be used for modeling the reliability of manufactured instances of a specific integrated circuit chip that are sorted into performance process window bins and for assigning reliability levels and, particularly, minimum reliability levels to the various performance process window bins, as described above, based on that reliability modeling. Additionally, it should be noted that such reliability modeling can be performed so as to take into account multiple different reliability failure mechanisms and so as to take into account the fact that the probability of the occurrence of a failure due to any one or more of these failure mechanisms may vary as a function of the different performance process windows. For example, the present method can use a technique similar to that described in U.S. patent application Ser. No. 13/922,311. That is, for each performance process window bin, reliability models associated with different failure mechanisms for the manufactured instances of the specific integrated circuit chip can be generated. Then, based on the reliability models associated with the different failure mechanisms for a given performance process window bin, an aggregate reliability model for that given performance process window bin can be generated. Such aggregate reliability models can further be generated for each performance process window bin. The resulting aggregate reliability models, which indicate overall failure probabilities for each of the different performance process window bins, can then be used to determine the expected useful life of the integrated circuit chips in each of the different performance process window bins and, thereby used to set the different reliability levels and, particularly, the different worst-case reliability levels to be assigned to the performance process window bins.

Subsequently, the data 151 and, particularly, the chip-level performance specification(s) 132 and the chip-level reliability specification 133 for a specific integrated circuit chip identified on the specific list 121 for incorporation into the specific system, as well as an inventory 140 for that specific integrated circuit chip, can be accessed (e.g., by the processor 160) and the inventory 140 can be used (e.g., by the processor 160) to select one of the multiple instances of the specific integrated circuit chip from one of the bins (e.g., from bin A-I) for actual incorporation into the specific system (508). Selection of the instance of the specific integrated circuit chip at process 508 can specifically be performed such that both the chip-level performance specification(s) 132 and the chip-level reliability specification 133 are met and, thereby such that the system-level performance specification(s) 122 and the system-level reliability specification 123 are met.

For example, referring to the inventory 140 of FIG. 3, if the chip-level performance specification 132 indicates that the Fmax-chip must be at least as fast as any instance of the specific integrated circuit chip in bin D with A being the fastest bin and I being the slowest bin and if the chip-level reliability specification 133 is reliability level 3 with 1 being the highest and 3 being the lowest reliability, then the instance of the specific integrated circuit chip can be selected at process 508 from bin D. However, if the chip-level performance specification 132 indicates that the Fmax-chip must be at least as fast as any instance of the specific integrated circuit chip in bin C and if the chip-level reliability specification 133 is reliability level 2 (or "Medium"), then the instance of the specific integrated circuit chip can be selected at process 508 from bin B.

It should be noted that, within the inventory 140, a part identifier (also referred to herein as a part number) can identify the specific integrated circuit chip (i.e., the specific processor chip, the specific memory chip, etc.), the performance process window into which the measured performance value of that particular manufactured instance of the specific integrated circuit chip falls (i.e., the specific performance process window bin), and the reliability level assigned to the specific performance process window bin. For example, referring to the inventory 140, a part identifier (e.g., IA3, IB2, IC1, ID3, etc.) can indicate the specific integrated circuit chip (i.e., Integrated Circuit Chip I), a specific performance process window bin for that chip (e.g., performance process window bin A, B, C, D, E, F, G, H or I) and a reliability level assigned to the specific performance process window bin (e.g., 1, 2 or 3). Thus, the specific integrated circuit chip that meets the chip-level performance specification(s) 132 and the chip-level reliability specification 133 for incorporation into a specific system can be selected at process 508 by using the corresponding part identifier (e.g., IA3, IB2, IC1, etc.).

The method can further comprise repeating (e.g., by the processor) process 508 above for each additional integrated circuit identified on the specific list 121 for incorporation into the specific system (510). That is, for each additional integrated circuit chip (e.g., each additional processor chip, each additional memory chip, etc.) identified on the specific list 121 for incorporation into the specific system, additional chip-level performance specification(s), an additional chip-level reliability specification and an additional inventory, which references manufactured instances of that additional integrated circuit chip sorted into bins that are associated with the different performance process windows and that are assigned different reliability levels can be accessed and the additional inventory can be used to select a manufactured instance of that additional integrated circuit chip from one of the bins so as to meet the additional chip-level performance specification and the additional chip-level reliability specification. The method can further comprise repeating the processes 504-510 above processor 160 for all integrated circuit chips identified in another list for incorporation into yet another system (512).

Additionally, after a manufactured instance of the specific integrated circuit chip is selected and actually incorporated into the specific system, feedback can be received (e.g., by the processor) regarding the operation of the specific integrated circuit chip within the specific system and this feedback can be used to define a chip-level reliability specification for a subsequent system integration process. Thus, for example, this feedback can indicate the actual number of power on hours (POHs) of that manufactured instance of the specific integrated circuit chip within the specific system and, based on the actual number of power on hours (POHs), the minimum estimated number of power on hours (POHs) 134 for that specific integrated circuit chip within the specific system can be adjusted (e.g., by the processor 160) and this adjusted minimum estimated number of power on hours (POHs) can be stored for use during a subsequent integrated circuit chip selection process. This feedback can, for example, be received directly from the specific system (e.g., over a wired or wireless network connection). Alternatively, the feedback can be received any other source (e.g., a server that collects such data, a designer or other user that inputs the data, etc.).

Also disclosed herein is an embodiment of a computer program product for system integration. The computer program product can comprise a computer readable storage medium that stores a program instructions, which is executable by a computer system to cause the computer system to perform the above described system integration method. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A representative hardware environment for implementing the computer systems, methods and computer program products disclosed above is depicted in FIG. 2. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed systems, methods and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above is an embodiment of a computer system for system integration (i.e., a system integrator), wherein integrated circuit chip selection for a specific system is performance and reliability optimized and, thereby cost optimized. The computer system can comprise a memory and a processor in communication with the memory. The memory can store a chip-level performance specification and a chip-level reliability specifications, each defined for a specific integrated circuit chip that is to be incorporated into a specific system. The memory can also store an inventory that references manufactured instances of the specific integrated circuit chip sorted into bins, which are associated with different performance process windows and which are assigned different reliability levels. The processor can access the memory and, using the inventory, can select one of the manufactured instances of the specific integrated circuit chip from one of the bins for incorporation into the specific system and can, specifically, select one of the manufactured instances of the specific integrated circuit chip so that it meets the chip-level performance specification and the chip-level reliability specification. Also disclosed above are embodiments of a computer-implemented method and a computer program product that can similarly be used to perform system integration.

The system integration embodiments disclosed herein are beneficial over prior art system integration systems and methods because, when a chip-level reliability specification is lower than the system-level reliability specification of the specific system that will incorporate it, for example, in cases where the estimated minimum number of power on hours (POHs) of the specific integrated circuit chip is less than the expected useful life of the specific system, as measured in power on hours (POHs), a lower reliability and, thereby a less costly integrated circuit chip can be used.

What is claimed is:

1. A method for system integration, said method comprising:
   accessing, by a processor from a memory, a chip-level performance specification, a chip-level reliability specification and an inventory,
      said chip-level performance specification and said chip-level reliability specification each being for a specific integrated circuit chip identified for incorporation into a specific system,
      said specific system having a system-level reliability specification,
      said chip-level reliability specification being defined so that, when said specific integrated circuit chip is incorporated into said specific system, said specific system meets said system-level reliability specification, and
      said inventory referencing manufactured instances of said specific integrated circuit chip sorted into bins associated with different performance process windows and assigned different reliability levels; and,
   selecting, by said processor from said inventory, one of said manufactured instances of said specific integrated circuit chip from one of said bins for incorporation into said specific system, said one of said manufactured instances of said specific integrated circuit chip being selected to meet said chip-level performance specification and said chip-level reliability specification.

2. The method of claim 1, said chip-level reliability specification being defined based on an estimated number of power on hours (POHs) for said specific integrated circuit chip during a useful life of said specific system and comprising a minimum number of power on hours (POHs) during which said specific integrated circuit chip is expected, with a specified probability, to perform without fail.

3. The method of claim 2, further comprising, after said one of said manufactured instances of said specific integrated circuit chip is incorporated into said specific system, receiving, by said processor, feedback as to an actual number of power on hours (POHs) of said one of said manufactured instances of said specific integrated circuit chip within said specific system and adjusting, by said processor for use during a subsequent integrated circuit chip selection process, said estimated number of power on hours (POHs) based on said actual number of power on hours (POHs).

4. The method of claim 1,
   each bin being associated with a specific performance process window and any manufactured instances of said specific integrated circuit chip in said bin exhibiting, during performance testing, performance values within said specific performance process window, and
   each bin further being assigned a reliability level, said reliability level being determined using an aggregate reliability model for said any manufactured instances of said specific integrated circuit chip in said bin and said aggregate reliability model being generated based on reliability models associated with different failure mechanisms for said any manufactured instances of said specific integrated circuit chip in said bin.

5. The method of claim 4, said reliability level indicating a minimum number of power on hours (POHs) during which each manufactured instance of said specific integrated circuit chip contained in said bin is expected, with a specified probability, to perform without fail.

6. The method of claim 1, said inventory associating an identifier with each of said bins, said identifier indicating said specific integrated circuit chip, a specific performance process window and a reliability level.

7. The method of claim 1, said different performance process windows comprising different ranges of maximum oscillation frequency.

8. The method of claim 1, further comprising repeating, by said processor, said accessing and said selecting for each additional integrated circuit chip identified for incorporation into said specific system.

9. A computer system for system integration, said computer system comprising:
   a memory storing a chip-level performance specification, a chip-level reliability specification and an inventory,
      said chip-level performance specification and said chip-level reliability specification each being for a specific integrated circuit chip identified for incorporation into a specific system,
      said specific system having a system-level reliability specification,
      said chip-level reliability specification being defined so that, when said specific integrated circuit chip is incorporated into said specific system, said specific system meets said system-level reliability specification, and
      said inventory referencing manufactured instances of said specific integrated circuit chip sorted into bins associated with different performance process windows and assigned different reliability levels; and, a processor accessing said memory and selecting, from said inventory, one of said manufactured instances of said specific integrated circuit chip from one of said bins for incorporation into said specific system, said one of said manufactured instances of said specific integrated circuit chip being selected to meet said chip-level reliability specification.

10. The computer system of claim 9, said chip-level reliability specification being defined based on an estimated number of power on hours (POHs) for said specific integrated circuit chip during a useful life of said specific system and comprising a minimum number of power on hours (POHs) during which said specific integrated circuit chip is expected, with a specified probability, to perform without fail.

11. The computer system of claim 10, said processor further receiving, after said one of said manufactured instances of said specific integrated circuit chip is incorporated into said specific system, feedback as to an actual number power on hours (POHs) of said one of said manufactured instances of said specific integrated circuit chip within said specific system and adjusting, for use during a subsequent integrated circuit chip selection process, said estimated number of power on hours (POHs) based on said actual number of power on hours (POHs).

12. The computer system of claim 9,
each bin being associated with a specific performance process window and any manufactured instances of said specific integrated circuit chip in said bin exhibiting, during performance testing, performance values within said specific performance process window, and
each bin further being assigned a reliability level, said reliability level being determined using an aggregate reliability model for said any manufactured instances of said specific integrated circuit chip in said bin and said aggregate reliability model being generated based on reliability models associated with different failure mechanisms for said any manufactured instances of said specific integrated circuit chip in said bin.

13. The computer system of claim 12, said reliability level indicating a minimum number of power on hours (POHs) during which each manufactured instance of said specific integrated circuit chip contained in said bin is expected, with a specified probability, to perform without fail.

14. The computer system of claim 9, said inventory associating an identifier with each of said bins, said identifier indicating said specific integrated circuit chip, a specific performance process window and a reliability level.

15. The computer system of claim 9, said different performance process windows comprising different ranges of maximum oscillation frequency.

16. The computer system of claim 9, said processor further repeating said accessing and said selecting for each additional integrated circuit chip identified for incorporation into said specific system.

17. A computer program product for system integration, said computer program product comprising a computer readable storage medium storing a program instructions, said program instructions being executable by a computer system to cause said computer system to perform a method, said method comprising:
accessing, from a memory, a chip-level performance specification, a chip-level reliability specification and an inventory,
said chip-level performance specification and said chip-level reliability specification each being for a specific integrated circuit chip identified for incorporation into a specific system,
said specific system having a system-level reliability specification,
said chip-level reliability specification being defined so that, when said specific integrated circuit chip is incorporated into said specific system, said specific system meets said system-level reliability specification, and
said inventory referencing manufactured instances of said specific integrated circuit chip sorted into bins associated with different performance process windows and assigned different reliability levels; and,
selecting, from said inventory, one of said manufactured instances of said specific integrated circuit chip from one of said bins for incorporation into said specific system, said one of said manufactured instances of said specific integrated circuit chip being selected to meet said chip-level reliability specification.

18. The computer program product of claim 17, said chip-level reliability specification being defined based on an estimated number of power on hours (POHs) for said specific integrated circuit chip during a useful life of said specific system and comprising a minimum number of power on hours (POHs) during which said specific integrated circuit chip is expected, with a specified probability, to perform without fail.

19. The computer program product of claim 18, said method further comprising, after said one of said manufactured instances of said specific integrated circuit chip is incorporated into said specific system, receiving feedback as to an actual number of power on hours (POHs) of said one of said manufactured instances of said specific integrated circuit chip within said specific system and adjusting, for use during a subsequent integrated circuit chip selection process, said estimated number of power on hours (POHs) based on said actual number of power on hours (POHs).

20. The computer program product of claim 17,
each bin being associated with a specific performance process window and any manufactured instances of said specific integrated circuit chip in said bin exhibiting, during performance testing, performance values within said specific performance process window, and
each bin further being assigned a reliability level, said reliability level being determined using an aggregate reliability model for said any manufactured instances of said specific integrated circuit chip in said bin and said aggregate reliability model being generated based on reliability models associated with different failure mechanisms for said any manufactured instances of said specific integrated circuit chip in said bin.

* * * * *